US006578642B2

United States Patent
Cox et al.

(10) Patent No.: US 6,578,642 B2
(45) Date of Patent: Jun. 17, 2003

(54) REAR MOUNTED ATTACHMENT WITH SINGLE ACTING CYLINDER

(75) Inventors: Philip David Cox, Polk City, IA (US); Matthew Bryant Jones, Ankeny, IA (US); James Franklin Bierl, West Des Moines, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/908,361

(22) Filed: Jul. 18, 2001

(65) Prior Publication Data

US 2003/0015327 A1 Jan. 23, 2003

(51) Int. Cl.[7] .............................................. A01B 35/06
(52) U.S. Cl. ..................... 172/624.5; 172/196; 172/166
(58) Field of Search ................................. 172/166, 140, 172/195, 196, 669, 624.5, 675

(56) References Cited

U.S. PATENT DOCUMENTS

| | | | | |
|---|---|---|---|---|
| 3,663,032 A | * | 5/1972 | Hook et al. | |
| 4,336,844 A | * | 6/1982 | Helbig et al. | |
| 4,505,455 A | * | 3/1985 | Beatty | |
| 4,694,773 A | * | 9/1987 | Sparkes et al. | |
| 4,865,132 A | * | 9/1989 | Moore, Jr. | |
| 5,513,943 A | * | 5/1996 | Lugash et al. | |
| 5,535,832 A | * | 7/1996 | Benoit | |
| 5,715,892 A | * | 2/1998 | Foster | |
| 5,797,460 A | | 8/1998 | Parker et al. | ............... 172/151 |
| 6,354,382 B1 | * | 3/2002 | Jarman et al. | |

OTHER PUBLICATIONS

On The Go DMI Turbo–champ brochure, Oct. 1983, 4 pages.*
WIL–RICH Couter Chisel Plow brochure, Oct. 1981, 1 pages.*

* cited by examiner

*Primary Examiner*—Victor Batson

(57) ABSTRACT

A trailing attachment for a deep tillage implement is supported from the implement frame by transversely spaced four-bar linkages extending rearwardly from the frame. Single acting hydraulic cylinders are pressurized to lift and adjust the attachment. A breather plug and a U-shaped hose allow air to be pushed from the rod end as each cylinder extends. To lower the trailing attachment, an SCV is moved to open the base ends of the cylinders to the return line of the hydraulic system, and the weight of the attachment moves the tools into ground engagement. If vertical lifting force exceeds attachment weight during operation, air is pushed out through the breather plug and a vacuum is drawn in the base ends so the attachment can lift to avoid excessive forces, even if the SCV is in neutral and blocking fluid flow into the base ends.

19 Claims, 2 Drawing Sheets

REAR MOUNTED ATTACHMENT WITH SINGLE ACTING CYLINDER

FIELD OF THE INVENTION

The present invention relates to agricultural tillage tools such as rippers, and more specifically to trailing implements for such tools.

BACKGROUND OF THE INVENTION

Rippers have been used to fracture soil and eliminate soil compaction without substantial destruction of the soil surface. Rear mounted soil conditioning attachments such as disk levelers are commonly used to provide a leveling function behind the ripper shanks. The attachments are typically raised and lowered with changing soil conditions or varying soil conservation requirements within a field.

Double acting cylinders or mechanical adjusters are used to maintain the attachments in a generally fixed position relative to the ripper frame. If the tractor selective control valve (SCV) is placed in the neutral position or if mechanical height adjusters are used, the attachment can be locked relative to the frame and generate extremely high loads through the frame members when the implement travels through a ditch or other depression or if the rear attachment is set too deep. Depth problems are particularly acute in ripper tools since the ripper standards aggressively pull the machine into the ground. Most rear mounted attachments for rippers have limited flexibility, and in some ground conditions one side of the attachment tends to dig too deeply while the other side lifts from the ground. Cushioning springs are often required for limiting problems with excessive force transfer and depth control. Attitude of the trailing attachment tools changes with changes in vertical position of the attachment relative to the implement frame with single link arms.

SUMMARY OF THE INVENTION

It is therefore an object of the present invention to provide an improved trailing attachment for a ripper or similar agricultural implement. It is a further object to provide such an attachment which overcomes most or all of the above problems.

It is another object of the present invention to provide an improved trailing attachment for a ripper which has better overload protection than at least most trailing attachments. It is another object to provide such an attachment which is adjustable hydraulically and yet which is flexible regardless of the SCV position while operating in the field. It is another object to provide such an attachment wherein flexibility and overload protection are provided independently of cushioning springs.

It is still another object of the present invention to provide an improved leveling attachment or similar trailing assembly for a ripper or other agricultural trailing implement arrangement which is simple in construction, has good flexibility and depth control characteristics, and provides some adjustability on-the-go from the tractor cab. It is another object to provide such an attachment which can be supported in a relatively fixed position above a mechanically set down stop position without inducing excessive loading on the supporting implement when traversing uneven terrain.

A trailing attachment for a deep tillage tool such as a ripper includes a toolbar supported by first and second transversely spaced four-bar linkages extending rearwardly from the ripper frame. Connected between upper and lower links on each of the linkages is a single acting hydraulic cylinder having a base end connected to a source of hydraulic fluid under pressure through the tractor SCV. The base ends of the cylinders are pressurized to adjust the attachment vertically and raise the attachment out of the ground. The trailing attachment has sufficient weight for desired tool penetration of the ground independently of any down pressure springs. A mechanical depth stop, such as donuts mounted on the rod ends of the cylinders, or similar conventional device sets maximum depth.

To raise the trailing attachment, the SCV is moved to pressurize the base ends of the cylinders. A breather plug and a U-shaped hose connected to the rod end allows air to be pushed from the rod end as each cylinder extends. To lower the trailing attachment, the SCV is moved to open the base ends of the cylinders to the return line of the hydraulic system, and the weight of the attachment moves the tools into the ground until the maximum depth is reached. The operator can raise the attachment above maximum depth set by the depth stop by pressurizing the base ends of the cylinders and then putting the SCV in the blocking or neutral position. If for any reason the vertical lifting force on the attachment exceeds the weight of the attachment, air is pushed out through the breather plug and a vacuum is drawn in the base ends. The attachment can lift, even if the SCV is in neutral and blocking fluid flow into the base ends, to avoid excessive frame loading when going through a depression or when the ripper lowers because of the action of the ripper shanks pulling the machine too deeply. Each linkage can move a limited amount relative to the other linkage for flexibility over uneven terrain. Because protection is built into the hydraulic system, overload cushioning springs are not required. The system is simple in construction and operation and provides necessary flexibility, adjustability, and overload protection for a trailing implement, even when operating in fields with changing ground conditions and extreme surface contours. Attitude of the trailing attachment tools remains unchanged as vertical position of the attachment relative to the implement frame changes.

These and other objects, features and advantages of the present invention will become apparent to one skilled in the art upon reading the following detailed description in view of the drawings.

DESCRIPTION OF THE PREFERRED EMBODIMENT

Figure 1:
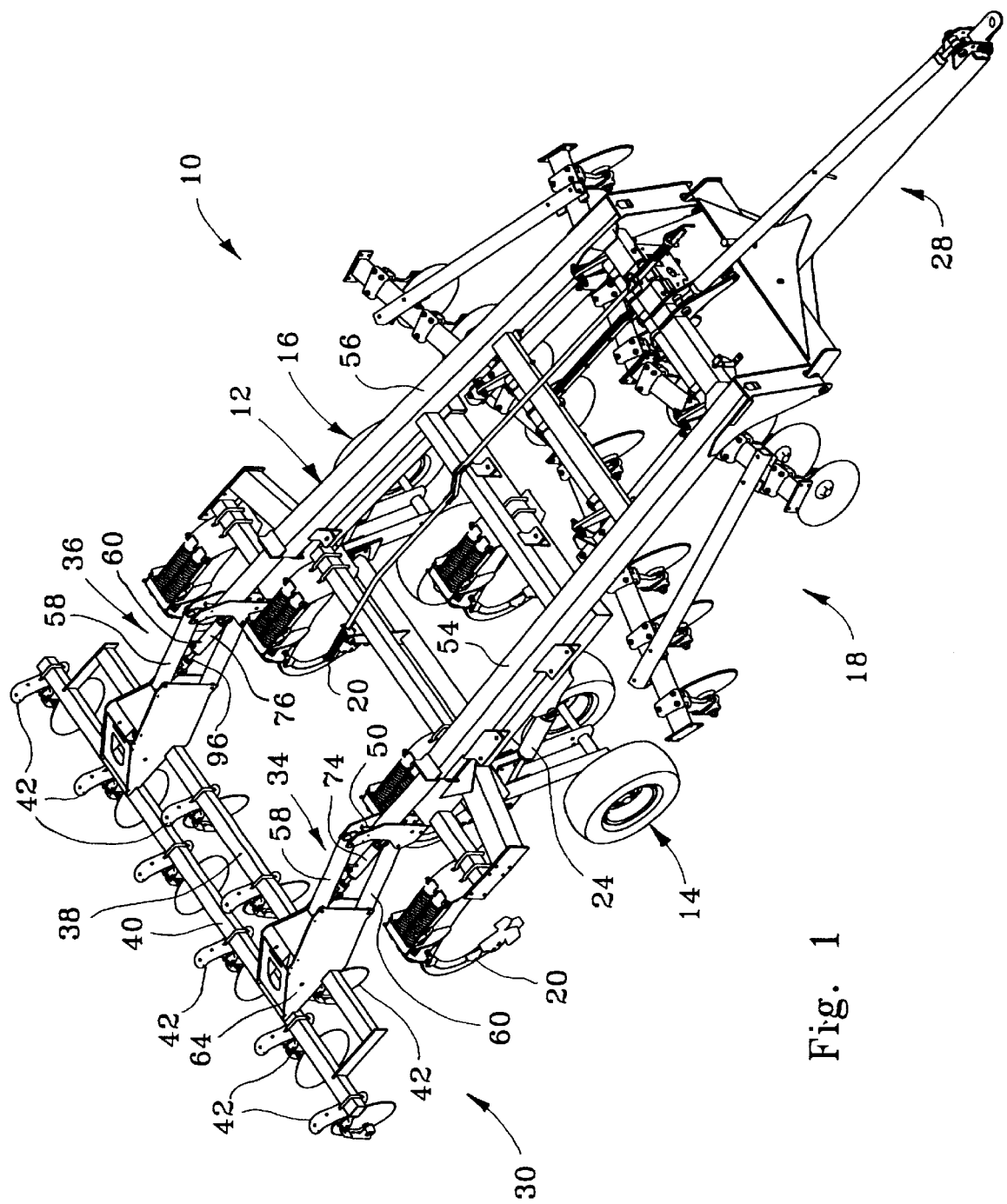
FIG. 1 is a front perspective view of a ripper implement with a trailing attachment attached thereto.

Referring now to FIG. 1, therein is shown a ripper implement 10 having main ripper frame 12 supported by lift wheel assemblies 14 and 16. Disk assemblies 18 are supported from the forward end of the frame 12 and shank-mounted deep tillage ripper tools 20 are transversely spaced on the aft portion of the frame. Hydraulic cylinders 24 move the frame 12 vertically between a raised transport position wherein the tools 20 are supported above the ground, and lowered field working positions wherein the tools 20 deeply penetrate the ground. The wheel assemblies may be adjusted vertically by the cylinders 24 to change the working depth of the tools 20 in the field working position. Leveling hitch structure 28 is connected to the forward end of the frame 12 for connection to a towing vehicle such as a tractor (not shown).

To provide a leveling function for the area worked by the disk assemblies 18 and the ripper tools 20, a trailing attachment 30 is adjustably supported from the aft end of the frame 12 by transversely spaced four bar linkage structures 34 and 36. The attachment 30, as shown in FIG. 1, includes a pair of transversely extending tubular toolbars 38 and 40 with depending tools such as spring-trip mounted disk blade assemblies 42 spaced along the toolbars. Each of the tools 20 is transversely adjustable on the frame 12 and each of the tools 42 is transversely adjustable along the corresponding toolbar 38 or 40 to provide a number of different tool layouts to accommodate different field conditions and operator preferences. The dual toolbar construction of the attachment 30 provides flexible tool spacing and good trash and soil flow between tools, as well as sufficient weight for the down forces necessary for proper ground engagement of the tools 42.

The linkage structures 34 and 36 include upright bracket structure 50 connected to the aft ends of diverging frame members 54 and 56 which form the backbone of the main ripper frame 12. Upper links 58 are pivotally connected at their forward ends to the upper portions of the bracket structure 50 above the level of the members 54 and 56. Lower links 60 pivotally connected to the lower portions of the brackets 50 below the member 54 and 56 and generally in alignment with the lower portion of the main frame 12 extend rearwardly to a pivotal connection with upright plate structures 64 which support the toolbars 38 and 40 a substantial distance behind the frame 12 and add weight to the trailing attachment. The aft ends of the upper links 58 are pivotally connected to the plate structures so the links 58 are generally parallel to the corresponding links 60. The four bar linkages 34 and 36 therefore maintain the attachment 30 at a constant attitude relative to the ground as the attachment moves up and down so the ground engaging and working characteristics of the tools 42 remain generally constant with vertical movement of the attachment.

Figure 2:
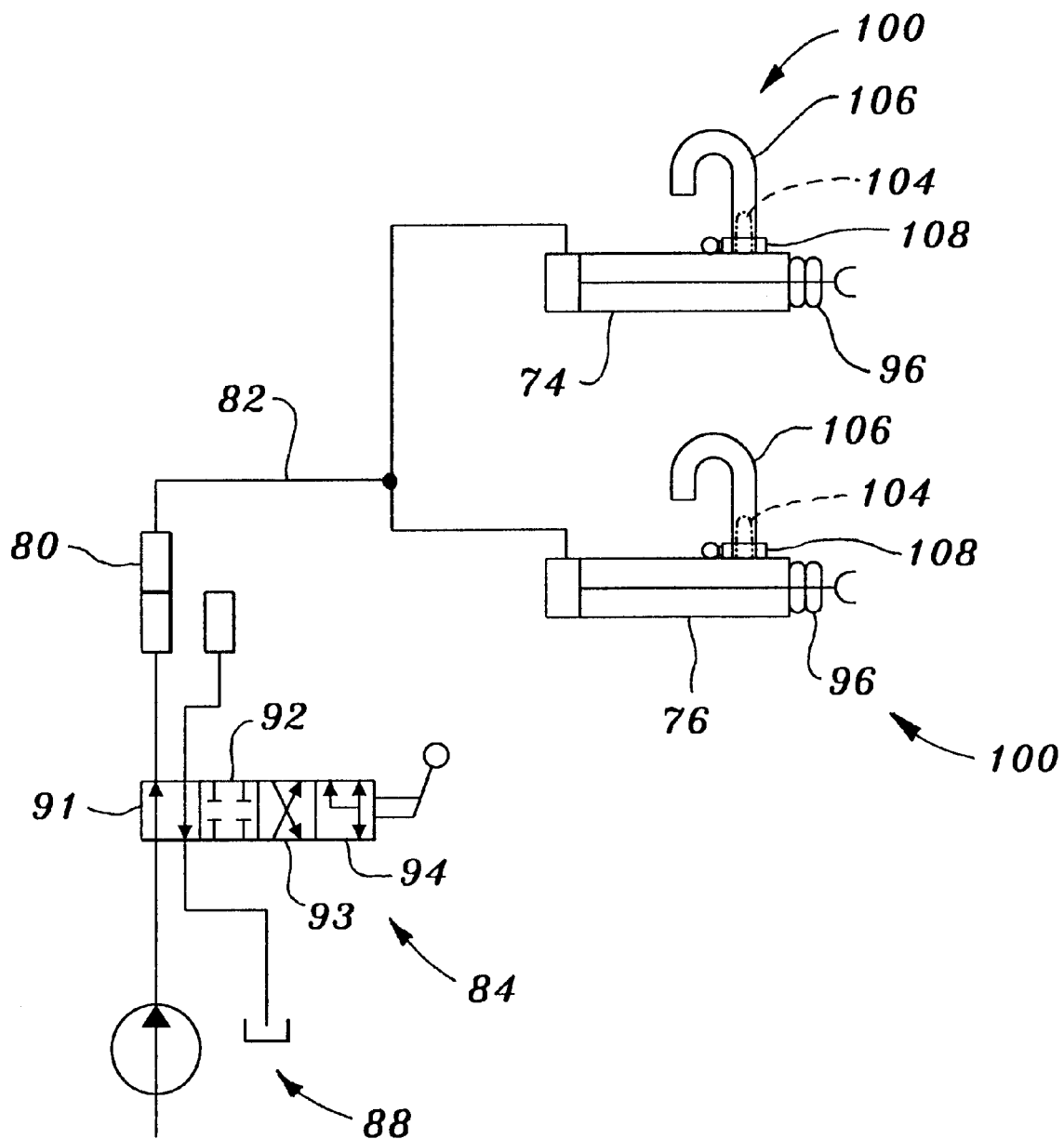
FIG. 2 is a schematic of the hydraulic circuit utilized with the trailing attachment of FIG. 1.

Single acting lift cylinders 74 and 76 include base ends pivotally connected to the corresponding brackets 50 and rod ends pivotally connected to the aft ends of the upper links 58. The cylinders 74 and 76 extend diagonally between the upper and lower links 58 and 60 and raise the attachment 30 relative to the frame 12 when extended. The base ends of the cylinders 74 and 76 are connected together and to a hydraulic connector 80 (FIG. 2) on the towing vehicle via hydraulic line structure 82. A tractor selective control valve (SCV) 84 is located between the connector 80 and a source of hydraulic fluid under pressure 88 on the tractor. The SCV 84 has a raise position 91 (shown) wherein hydraulic fluid under pressure is communicated to the base ends of the cylinders 74 and 76 via line 82 to extend the cylinders and raise the trailing attachment 30. A blocking or neutral position 92 blocks hydraulic fluid flow to and from the cylinders to generally maintain a preselected attachment position. When the SCV 84 is placed in a lower position 93 or float position 94, the base ends of the cylinders 74 and 76 are opened to reservoir to allow the cylinders to retract and the weight of the attachment 30 towards a lowermost position wherein the cylinders are bottomed against mechanical stop structure, such as depth stop donuts 96. The number of donuts 96 can be changed to adjust the lowermost position.

Breather assemblies 100 are connected to the rod end ports of the cylinders 74 and 76 to allow air to move in and out of the cylinders with retraction and extension of the cylinder rods and prevent dirt from contaminating the cylinders. Each assembly 100 includes a filter or breather 104 connected to a U-shaped breather tube 106 which opens downwardly into the atmosphere. Hose clamps 108 secure the cylinder mounting ends of the tubes 106 to the rod end ports. When the cylinders retract, filtered air is drawn into the rod ends of the cylinders. With extension, air is forced out of the rod ends, carrying some of the debris trapped by the filters 104 out of the assemblies 100.

To lower the trailing attachment, the SCV 84 is moved to position 93 or 94 to open the base ends of the cylinders to the return line of the hydraulic system, and the weight of the attachment 30 moves the tools 42 downwardly until the lowermost position determined by the donuts 96 is reached or until any lifting force on the attachment 30 balances the force of gravity. The operator can raise the attachment above maximum depth set by the depth stop donuts 96 by pressurizing the base ends of the cylinders and then putting the SCV in the blocking or neutral position 92. If for any reason the vertical lifting force on the attachment exceeds the weight of the attachment, air is pushed out through the breather assemblies 100 and a vacuum is drawn in the base ends and the line 82. The attachment can lift, even if the SCV is in neutral and blocking fluid flow into the base ends, to avoid excessive frame loading when going through a depression or when the ripper lowers because of the action of the ripper shanks pulling the machine too deeply. Each of the linkages 34 and 36 can move a limited amount relative to the other linkage for flexibility over uneven terrain. Fluid flow can be exchanged between the base ends of the cylinders 74 and 76 to equalize pressure and provide linkage structure differential vertical positioning, even when the SCV is in the blocking position, for added trailing attachment flexibility.

Having described the preferred embodiment, it will become apparent that various modifications can be made without departing from the scope of the invention as defined in the accompanying claims.

We claim:

1. A tillage implement having a generally transversely extending main frame supported by lift wheel structure for forward movement over a field, the implement including tool structure for penetrating the ground, a trailing attachment for working the ground behind the tool structure comprising:

a trailing support arm connected to the frame and extending rearwardly therefrom to an aft end;

an attachment frame connected to the aft end and including trailing tools for engaging the ground behind the tool structure, the support members and trailing tools providing sufficient weight to establish down pressure for ground penetration of the trailing tools independently of additional down pressure structures;

hydraulic lift structure including a single acting hydraulic cylinder having first and second ends and connected between the main frame and the support arms and operable to lift the trailing implement relative to the frame;

a stop member preventing lowering of the attachment frame below a lowermost position;

a control valve connected to a source of hydraulic fluid under pressure and having raise, lower and neutral positions;

a hydraulic line operably connecting the control valve to the first end of the cylinder;

wherein the control valve, in the raise position, operates the cylinder to lift the trailing attachment toward an uppermost position, and in the lower position allows the trailing attachment to lower under the force of gravity toward the lowermost position, and in the neutral position blocks hydraulic fluid from passing to and from the cylinder to generally maintain the attachment in a selected operating position relative to the frame, the selected operating position lying within a range from the lowermost position to an upper operating position below the uppermost position; and wherein lift forces on the attachment establish a pressure differential in the hydraulic line to permit the attachment to lift relative to the main frame from the selected operating position, even when the valve is the neutral position, when the lift forces exceed the force of gravity on the attachment, so that forces transferred to the main frame from the attachment frame are limited.

2. The trailing attachment as set forth in claim 1 including breather structure connected to the second end of the cylinder facilitating movement of air to and from the second end of the cylinder.

3. The attachment as set forth in claim 2 wherein the breather structure includes a filter and a U-shaped, downwardly opening air conduit connected to the second end and limiting dirt intake to the second end.

4. The attachment as set forth in claim 1 further comprising a second trailing support arm connected between the main frame and the attachment, and a second cylinder connected to the second trailing support arm and connected to the control valve for operation in parallel with the single acting cylinder.

5. The attachment as set forth in claim 4 wherein the second cylinder is also single acting.

6. The attachment as set forth in claim 4 wherein the attachment frame comprises first and second transversely extending tubular toolbars supported a substantial distance rearwardly of the main frame and the trailing tools comprise individual disk assemblies, the disk assemblies independently adjustable transversely on the tubular toolbars.

7. The attachment as set forth in claim 6 including an upright plate structure connected to and extending rearwardly from the trailing support arm, and wherein the tubular toolbars are fixed to the upright plates rearwardly of the trailing support arm, the plates and tubular toolbars providing substantial weight for down pressure on the trailing tools.

8. The attachment as set forth in claim 7 wherein the trailing support arm includes a four bar linkage having an upper forward pivot and a lower forward pivot, wherein the upper forward pivot is located above the main frame and the lower forward pivot is generally aligned with the main frame.

9. A tillage implement having a generally transversely extending main frame supported by lift wheel structure for forward movement over a field, the implement including tool structure for penetrating the ground, a trailing attachment for working the ground behind the tool structure comprising:

first and second transversely spaced trailing support arms connected to the frame and extending rearwardly therefrom to aft ends;

an attachment frame connected to the aft ends and including first and second fore-and-aft spaced transversely extending support members and trailing tools depending from the support members and engaging the ground behind the tool structure, the support members and trailing tools having a combined weight sufficient to provide down pressure for ground penetration of the trailing tools independently of additional down pressure structures;

hydraulic lift structure including a single acting hydraulic cylinder having first and second ends and connected between the main frame and the support arms and operable to lift the trailing implement relative to the frame;

a stop member preventing lowering of the attachment frame below a lowermost position;

a control valve connected to a source of hydraulic fluid under pressure;

a hydraulic line operably connecting the control valve to the first end of the cylinder;

wherein the control valve has a first position to operate the cylinder to lift the trailing attachment to an uppermost position, a second position to allow the trailing attachment to lower under the influence of the combined weight toward the lowermost position, and a blocking position wherein hydraulic fluid flow is blocked from passing to and from the cylinder to generally maintain the attachment in a selected operating position relative to the frame, the selected operating position lying within a range from the lowermost position to an upper operating position below the uppermost position; and breather structure connected to the second end of the cylinder facilitating movement of fluid to and from the cylinder, wherein a pressure differential is established in the line to permit the attachment to lift relative to the main frame from the selected operating position when the valve is the blocking position and lift forces exceed down pressure forces on the attachment, so that forces transferred to the main frame from the attachment frame are limited when the implement is working the ground with the control valve in the blocking position.

10. The implement as set forth in claim 9 wherein the attachment frame has a weight sufficient to provide trailing tool ground penetration without need for down pressure springs biasing the attachment downwardly.

11. The implement as set forth in claim 9 wherein the support arm structure comprises a four bar linkage maintaining the attachment frame at a generally constant attitude as the attachment frame moves vertically.

12. The implement as set forth in claim 9 wherein the hydraulic lift structure includes first and second cylinders connected in parallel, the first and second cylinders facilitating differential movement of the two support arms so angle of the trailing attachment about a generally fore and aft axis can change relative to the frame to follow ground contour.

13. The implement as set forth in claim 12 wherein the support arms comprise four bar linkages for maintaining attitude of the attachment tools generally constant with changes in vertical position of the attachment relative to the frame, and the cylinders are connected between upper and lower links on the four bar linkages.

14. A deep tillage implement having a generally transversely extending frame supporting shanks for penetrating the ground, a trailing attachment for working the ground behind the shanks comprising:

trailing implement support arm structure connected to the frame and extending rearwardly therefrom to a connection with trailing attachment tools;

hydraulic lift structure including a first single acting hydraulic cylinder having first and second ends connected between the frame and the support arm structure and operable to move the trailing implement vertically relative to the frame;

a hydraulic control connected to a source of hydraulic fluid under pressure, a line connecting the hydraulic control to the first end, the control having a lift position to pressurize the first end and operate the cylinder to lift the trailing attachment, and a field operating position wherein hydraulic fluid flow is blocked from passing through the valve to the cylinder to lift the attachment;

a breather connected to the second end of the cylinder facilitating movement of fluid to and from the second end when the cylinder retracts and extends, wherein a vacuum is drawn in the line to permit the attachment to lift relative to the frame when the valve is in the field operating position and lift forces exceed attachment weight, so that forces transferred to the frame from the attachment are limited when the implement is operating over depressions or when the depth of operation of the deep tillage implement increases; and wherein the support arm structure comprises a four bar linkage with upper and lower links and wherein the cylinder is located between the links.

15. The implement as set forth in claim 14 wherein the attachment has a weight sufficient to provide attachment tool ground penetration without need for down pressure springs biasing the attachment downwardly.

16. A deep tillage implement having a generally transversely extending frame supporting shanks for penetrating the ground, a trailing attachment for working the ground behind the shanks comprising:

trailing implement support arm structure connected to the frame and extending rearwardly therefrom to a connection with trailing attachment tools;

hydraulic lift structure including a first single acting hydraulic cylinder having first and second ends connected between the frame and the support arm structure and operable to move the trailing implement vertically relative to the frame;

a hydraulic control connected to a source of hydraulic fluid under pressure, a line connecting the hydraulic control to the first end, the control having a lift position to pressurize the first end and operate the cylinder to lift the trailing attachment, and a field operating position wherein hydraulic fluid flow is blocked from passing through the valve to the cylinder to lift the attachment;

a breather connected to the second end of the cylinder facilitating movement of fluid to and from the second end when the cylinder retracts and extends, wherein a vacuum is drawn in the line to permit the attachment to lift relative to the frame when the valve is in the field operating position and lift forces exceed attachment weight, so that forces transferred to the frame from the attachment are limited when the implement is operating over depressions or when the depth of operation of the deep tillage implement increases; and wherein the support arm structure comprises two offset arms, the first cylinder connected to the first arm, and wherein the hydraulic lift structure includes a second cylinder connected to the second arm and in parallel with the first cylinder, the first and second cylinders facilitating differential movement of the two offset arms so angle of the trailing attachment about a generally fore and aft axis can change relative to the frame to follow ground contour.

17. The implement as set forth in claim 16 wherein the offset arms comprise four bar linkages for maintaining attitude of the attachment tools generally constant with changes in vertical position of the attachment relative to the frame.

18. A deep tillage implement having a generally transversely extending frame supporting shanks for penetrating the ground, a trailing attachment for working the ground behind the shanks comprising:

trailing implement support arm structure connected to the frame and extending rearwardly therefrom to a connection with trailing attachment tools;

hydraulic lift structure including a first single acting hydraulic cylinder having first and second ends connected between the frame and the support arm structure and operable to move the trailing implement vertically relative to the frame;

a hydraulic control connected to a source of hydraulic fluid under pressure, a line connecting the hydraulic control to the first end, the control having a lift position to pressurize the first end and operate the cylinder to lift the trailing attachment, and a field operating position wherein hydraulic fluid flow is blocked from passing through the valve to the cylinder to lift the attachment;

a breather connected to the second end of the cylinder facilitating movement of fluid to and from the second end when the cylinder retracts and extends, wherein a vacuum is drawn in the line to permit the attachment to lift relative to the frame when the valve is in the field operating position and lift forces exceed attachment weight, so that forces transferred to the frame from the attachment are limited when the implement is operating over depressions or when the depth of operation of the deep tillage implement increases; and further comprising a mechanical stop to limit movement of the attachment below a preselected lowermost level, and wherein the hydraulic control is operable to raise the attachment hydraulically above the lowermost level.

19. The implement as set forth in claim 18 wherein the hydraulic control includes a blocking position for maintaining the attachment in a hold position above the lowermost level, and wherein the breather and line facilitate movement of the attachment above the hold position.

* * * * *